(12) United States Patent
Tomilson

(10) Patent No.: US 7,072,449 B2
(45) Date of Patent: Jul. 4, 2006

(54) SYSTEM AND METHOD FOR ESTABLISHING A POWER LEVEL FOR A COMMUNICATION SIGNAL TRANSMITTED IN A CONDUCTOR

(75) Inventor: Andrew Gordon Tomilson, Nepean (CA)

(73) Assignee: Alcatel Canada Inc., Kanata (CA)

( * ) Notice: Subject to any disclaimer, the term of this patent is extended or adjusted under 35 U.S.C. 154(b) by 181 days.

(21) Appl. No.: 10/318,050

(22) Filed: Dec. 13, 2002

(65) Prior Publication Data

US 2004/0114751 A1 Jun. 17, 2004

(51) Int. Cl.
*H04M 1/24* (2006.01)
*H04M 3/08* (2006.01)
*H04M 3/22* (2006.01)

(52) U.S. Cl. ............... 379/27.01; 379/27.03; 379/27.04; 379/27.08; 375/220; 375/222

(58) Field of Classification Search ........... 379/399.01, 379/414, 416, 417, 1.01, 1.03, 3, 27.02, 27.03, 379/27.01, 1.04, 24, 27.08, 27.05, 31, 32.01, 379/32.04; 375/220, 222
See application file for complete search history.

(56) References Cited

U.S. PATENT DOCUMENTS

| | | | | |
|---|---|---|---|---|
| 5,887,032 A * | 3/1999 | Cioffi | .................. | 375/257 |
| 5,991,271 A * | 11/1999 | Jones et al. | .................. | 370/252 |
| 6,035,000 A * | 3/2000 | Bingham | .................. | 375/296 |
| 6,055,297 A * | 4/2000 | Terry | .................. | 379/1.01 |
| 6,229,855 B1 * | 5/2001 | Takatori et al. | .................. | 375/296 |
| 6,246,716 B1 * | 6/2001 | Schneider | .................. | 375/220 |
| 6,532,277 B1 * | 3/2003 | Ulanskas et al. | .................. | 379/27.01 |
| 6,614,879 B1 * | 9/2003 | Cole | .................. | 379/1.01 |
| 6,650,697 B1 * | 11/2003 | Tate et al. | .................. | 375/222 |
| 6,845,149 B1 * | 1/2005 | Liu | .................. | 379/24 |
| 2003/0108191 A1 * | 6/2003 | Kerpez | .................. | 379/399.01 |
| 2003/0112967 A1 * | 6/2003 | Hausman et al. | .................. | 379/417 |

* cited by examiner

*Primary Examiner*—Curtis Kuntz
*Assistant Examiner*—Tuan Pham
(74) *Attorney, Agent, or Firm*—McCarthy Tétrault LLP

(57) ABSTRACT

A method of establishing a transmission power level for signals transmitted in a conductor is provided in an environment where signal interference is present between the signals in the conductor and separate signals carried in a proximate conductor. The method includes the steps of determining a reference signal interference level at an end of the proximate conductor from a reference signal capable of being propagated from an opposing end of the proximate conductor and determining a transmission power level for the signals to provide a signal interference level based on the reference signal interference level. A system embodying the method is also provided.

23 Claims, 11 Drawing Sheets

SYSTEM AND METHOD FOR ESTABLISHING A POWER LEVEL FOR A COMMUNICATION SIGNAL TRANSMITTED IN A CONDUCTOR

FIELD OF THE INVENTION

The invention relates to a system and method for establishing a power level for transmission signals in digital communication systems, in particular power levels for signals, such as ADSL and VDSL signals, transmitted in wire conductors.

BACKGROUND OF INVENTION

In communications systems, when two adjacent conductors carry signals, each conductor leaks a portion of its signal into the adjacent conductor, causing interference. Such interference is known as crosstalk. If crosstalk interference becomes too high for a signal, information in the signal may not be identifiable.

Digital Subscriber Line (DSL) services have been developed to operate using existing telephone copper wires providing users with relatively high-speed digital data communication services. As DSL signals are carried on copper wires, they are susceptible to crosstalk.

There are several classes of DSL services; some DSL services use frequencies that overlap with other DSL services. The many types of DSL service, Asymmetric Digital Subscriber Line (ADSL), Very High Speed Digital Subscriber Line (VDSL), High Speed Digital Subscriber Line (HDSL), etc., are referred to collectively as xDSL. Standards set for the different xDSL services specify power levels used to transmit their xDSL signals. The power level of a xDSL signal at a destination for that signal relative to the noise at the destination (i.e. the signal-to-noise ratio, or SNR) determines the transmission rate for that xDSL service; the higher the received SNR, the higher data throughput capacity of the transmission channel.

Standards set for the different xDSL services also specify frequencies used by their signals. Some xDSL services use frequencies that overlap with other xDSL services. As a general characteristic of transmitted signals, an xDSL signal attenuates as the signal propagates further away from the source. Higher frequency signals are more susceptible to this characteristic, attenuating more than lower frequency signals which have propagated the same distance. A low powered signal may be more susceptible to interference and crosstalk than a high powered signal. As such, xDSL services using higher frequencies must be deployed closer to the user to ensure an adequate power signal for transmissions. For example, some ADSL services, using lower frequencies than some VDSL services, have a maximum range of approximately 5.5 km from the source, while some VDSL services have a maximum range of approximately 1.5 km from the source. Therefore, there is an incentive to provide DSL services using higher frequency ranges from a source closer to the end user. The signals of these DSL services are provided from a cabinet, or remote terminal, but still may be transmitted to the end user in wires adjacent to DSL signals transmitted from a more distant source, such as the central office.

Interference introduces noise and effectively reduces the transmission rate for a DSL signal. A first DSL signal of two DSL signals may be associated with spectrum management standards restricting the amount of interference the second DSL signal can introduce to the first DSL signal. Generally, a DSL signal will cause more interference to another DSL signal of the same frequency when transmitted at a higher power level than a lower power level. This interference may be within acceptable levels as dictated by the spectrum management standards when the first and second DSL signals are of equal power levels or the first has a higher power level than the second DSL signal. If the first DSL signal does not have a higher power level, crosstalk may be above levels acceptable by the standards. If the second DSL signal having a cabinet as its source share the same frequencies as the first DSL signal having a more distant source, there is a risk that the second DSL signal will have a higher power level than the first DSL signal and may cause unacceptable levels of crosstalk for the first DSL signal.

Prior art methods determine power levels of DSL signals to minimize crosstalk by using a minimally acceptable power level for such a second DSL signal. However, as lower frequencies are capable of transmitting more data than higher frequencies because of lesser attenuation, it is preferable to have the power level of the second DSL signal as high as possible while keeping crosstalk from the second DSL signal to the first DSL signal within acceptable standards.

There is a need for a system and method to increase power levels of a DSL signal while keeping crosstalk from the DSL signal to other DSL signals within acceptable standards.

SUMMARY OF INVENTION

In a first aspect, a method of establishing a transmission power level for signals transmitted in a conductor is provided in an environment where signal interference is present between the signals in the conductor and separate signals carried in a proximate conductor. The method includes the steps of determining a reference signal interference level at an end of the proximate conductor from a reference signal capable of being propagated from an opposing end of the proximate conductor and determining a transmission power level for the signals to provide a signal interference level based on the reference signal interference level.

The method may also include the step of transmitting the signals at the transmission power level.

The signals, the separate signals and the reference signal may be xDSL signals.

The separate signals and the reference signal may be ADSL signals and the signals may be one of (a) VDSL signals and (b) ADSL signals.

The transmission power level may be determined utilizing a transmission power level function that is dependent on frequency of the signals.

The step of determining the transmission power level may further utilize a first common loop length interference factor including a common loop length of the proximate conductor with the conductor carrying the signals and a first attenuation factor for signals propagated through the conductor.

The step of determining the transmission power level may further utilize a transmission power level for the reference signal, a second common loop length interference factor including a common loop length of the proximate conductor with a conductor for carrying the reference signal and a second attenuation factor for the reference signal capable of being propagated through the conductor for carrying the reference signal.

The transmission power level function may be expressed as:

$$VDSL_{PSD}(f) = ADSL_{FEXT}(f) - 10\log\left(K_{FEXT} \times L_c \times \left(\frac{1}{49}\right)^{0.6} \times f^2\right) + Atten(L_c, f)$$

where $VDSL_{PSD}$ is the transmission power level for the signals, $L_c$ is a common loop length of the proximate conductor with the conductor carrying the signals, $K_{FEXT}$ is a coupling constant for the conductor, f is the frequency of the signals, Atten is a first attenuation function for signals propagated through the conductor dependent on $L_c$ and f and $ADSL_{FEXT}$ is the reference signal interference level.

The common loop length of the proximate conductor with the conductor carrying the signals, $L_c$, may provide an estimation of a worst case common loop length.

The reference signal interference level, $ADSL_{FEXT}$, may be calculated using the equation:

$$ADSL_{FEXT}(f) = Tx_{PSD}(f) + 10\log\left(K_{FEXT} \times L \times \left(\frac{1}{49}\right)^{0.6} \times f^2\right) - Atten(L, f)$$

where $Tx_{PSD}$ is a power level of the reference signal, L is a common loop length of the proximate conductor with a conductor for carrying the reference signal and Atten is a second attenuation function for the reference signal capable of being propagated through the conductor for carrying the reference signal dependent on L and f.

The reference signal may be a theoretical reference signal.

The conductor and the proximate conductor may be wires carrying electrical signals.

The conductor and the proximate conductor may be in a same binder group.

The conductor and the proximate conductor each may be a twisted pair of copper wire.

In a second aspect, a power level transmission controller for establishing a transmission power level for signals transmitted in a conductor is provided in an environment where signal interference is present between the signals in the conductor and separate signals carried in a proximate conductor. The transmitting controller device includes a transmission power level mask for regulating a transmission power level of the signals transmitted in the conductor. The transmission power level is regulated to provide a signal interference level to the separate signals in the proximate conductor based on a reference signal interference level at an end of the proximate conductor from a reference signal capable of being propagated from an opposing end of the proximate conductor.

In other aspects of the invention, various combinations and subsets of the above aspects are provided.

BRIEF DESCRIPTION OF THE DRAWINGS

The foregoing and other aspects of the invention will become more apparent from the following description of specific embodiments thereof and the accompanying drawings which illustrate, by way of example only, the principles of the invention. In the drawings, where like elements feature like reference numerals (and wherein individual elements bear unique alphabetical suffixes).

DETAILED DESCRIPTION OF THE EMBODIMENTS

Figure 1:
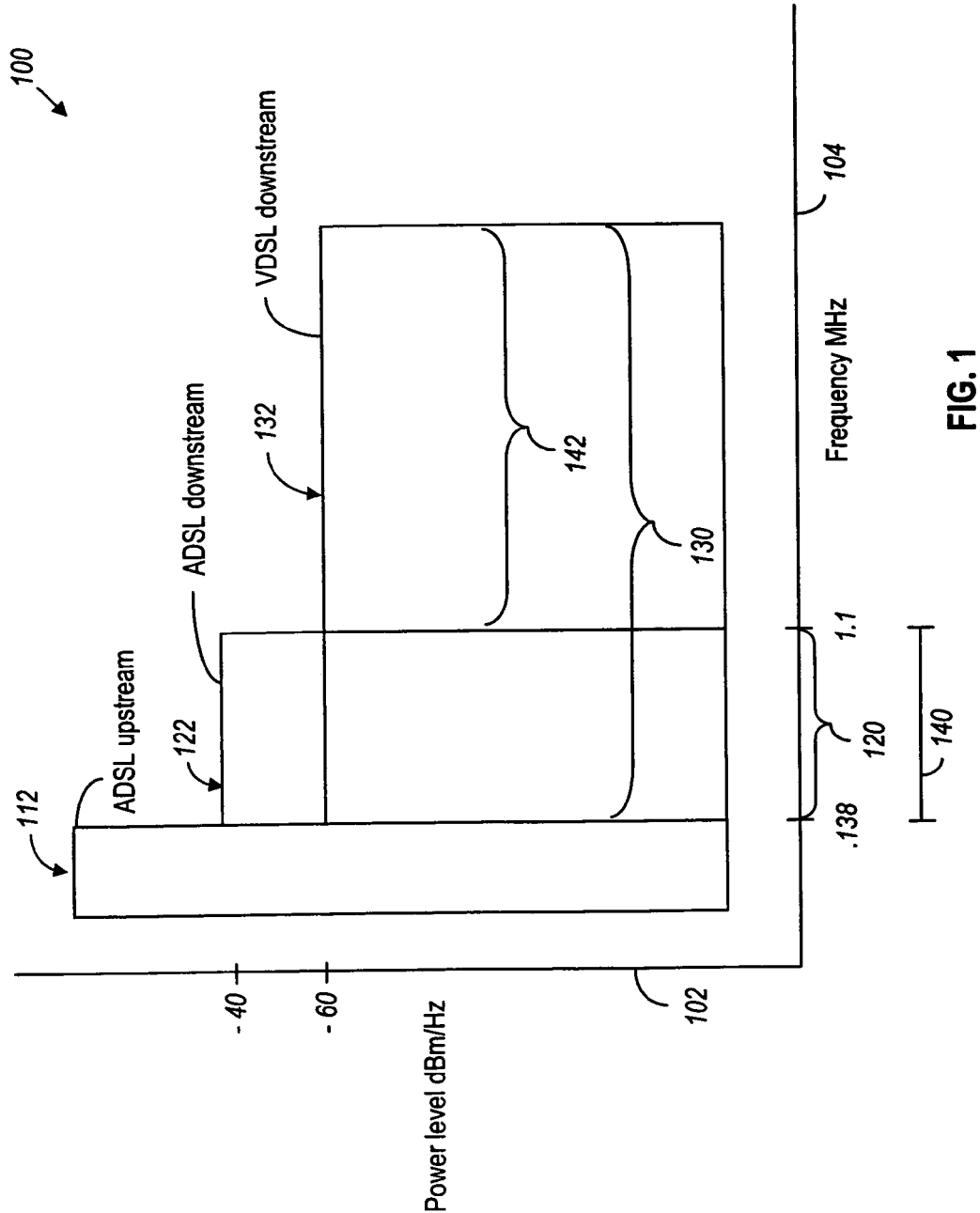
FIG. 1 is a graph illustrating frequencies and power levels used by Asymmetrical Digital Subscriber Line (ADSL) and Very High Speed Digital Subscriber Line (VDSL) services.

The description which follows, and the embodiments described therein, are provided by way of illustration of an example, or examples, of particular embodiments of the principles of the present invention. These examples are provided for the purposes of explanation, and not limitation, of those principles and of the invention. In the description which follows, like parts are marked throughout the specification and the drawings with the same respective reference numerals.

Briefly, the method of the embodiment determines crosstalk interference, in particular far end crosstalk (FEXT) interference, on a Digital Subscriber Line (DSL) signal from a reference DSL signal and uses the level of interference determined to establish a value for a power level for another DSL signal. This power level provides a similar amount of FEXT on the DSL signal. It will be appreciated that all power levels illustrated herein are based on power level models and accordingly power levels used by a system may deviate from results generated from the model.

Referring to FIG. 1, graph 100 illustrates frequencies and power levels for ADSL signals and VDSL signals. Graph 100 plots the power level of ADSL and VDSL signals in dBm/Hz on power axis 102 and the frequency in MHz on frequency axis 104.

ADSL, designed for asymmetric upstream and downstream bandwidth requirements for activities such as Internet surfing, provides to users a high bit rate in the downstream direction, i.e. from the source to the user, and a low bit rate in the upstream direction. Upstream communications generally carry command and control information and typically reside in frequencies in the range of 26 kHz to 138 kHz, indicated by bracket 110. The downstream direction for ADSL uses frequencies in the range of 138 kHz to 1.1 MHz, indicated by bracket 120. ADSL in the upstream direction is typically transmitted using a power level of −38 dBm/Hz, indicated by arrow 112. ADSL in the downstream direction is typically transmitted using a power level of −40 dBm/Hz, indicated by arrow 122. ADSL provides a downstream capacity of up to 12 Mbps.

VDSL provides higher transmission rates to users than ADSL and uses higher transmission frequencies than ADSL. Typical VDSL standards provide a downstream VDSL path in frequencies starting from 138 kHz, indicated by bracket 130. Downstream VDSL signals are typically provided at −60 dBm/Hz, indicated by arrow 132. The transmission frequency of VDSL signals provide a downstream capacity of up to 52 Mbps.

Telephone feeder and distribution cables, which may carry DSL signals, comprise one or more binder groups. Each binder group is typically 25 or 50 twisted copper pairs bound together within the cable. Twisted pairs within the same binder group are further twisted amongst the other twisted pairs in the binder group through the length of the cable such that all the pairs come within close proximity of all the other pairs over portions of the cables length. This results in certain random amount of crosstalk between all the pairs in the same binder group. Therefore, if two separate xDSL signals are transmitted in the same direction and using the same frequency travel in proximate conductors or wires in the same binder group, one signal can introduce crosstalk into the other signal as the signals propagate from the source.

As can be seen from FIG. 1, some frequencies used by ADSL and VDSL services overlap, indicated by bracket 140. Since VDSL services are transmitted at a lower power level than ADSL, if they are deployed from a common central office, downstream VDSL services do not adversely affect downstream ADSL services. However, as downstream VDSL services use higher frequencies than ADSL, indicated by bracket 142, their signals attenuate more quickly than lower frequency signals with increasing distance from the signal source. Accordingly, VDSL signals may be transmitted from a VDSL transmission device located in a cabinet which is in close proximity to the user and is connected via a link to the central office. However, from the cabinet, a full strength VDSL signal may interfere with ADSL signals transmitted from the central office on adjacent wires, which can be greatly attenuated by the length of cable between the central office and the cabinet. Inserting a relatively strong signal next to a relatively weak signal (in this case due to attenuation) in the same binder group can cause a relatively high level of crosstalk interference on the weak signal. This interference may cause a net reduction in the effective transmission rate of the ADSL signals, since the SNR of the received ADSL signals may be greatly reduced.

Figure 2A:
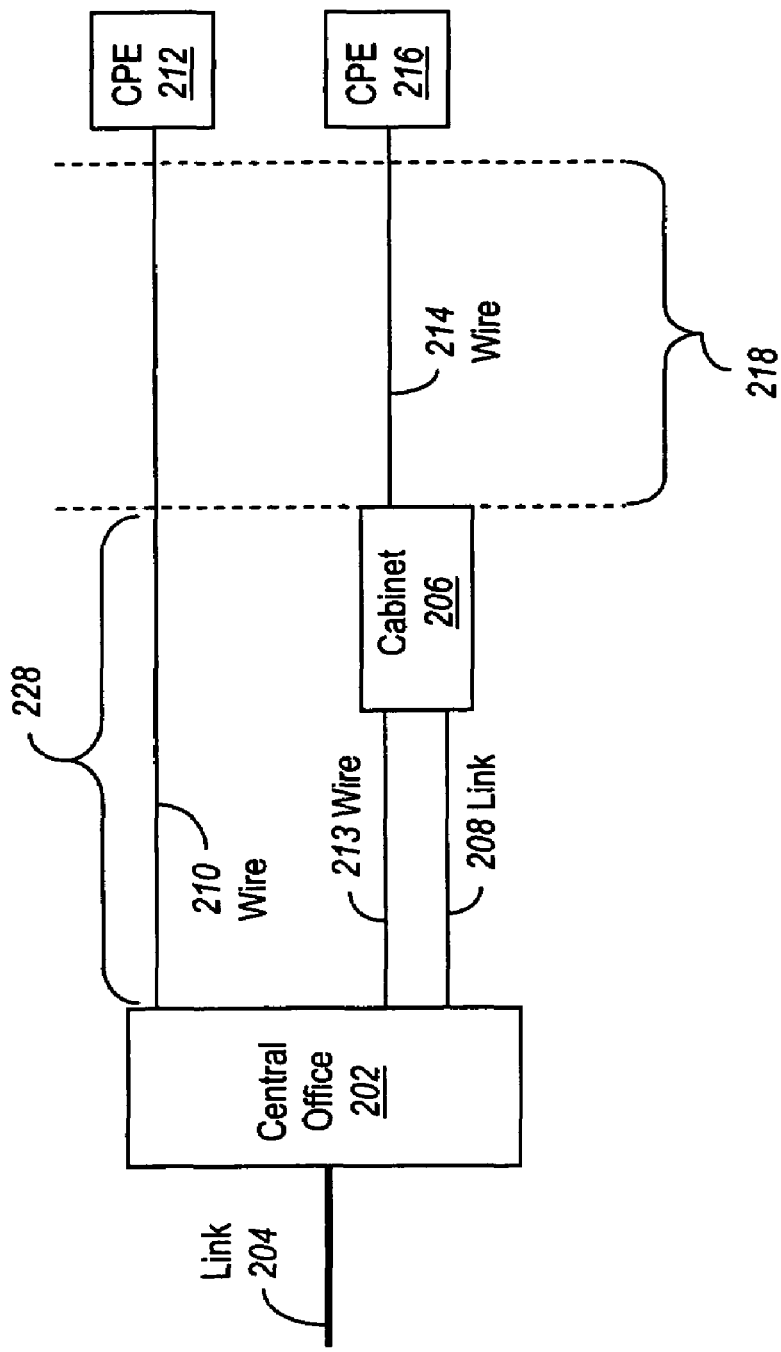
FIG. 2A is a block diagram of components of a DSL system.

Referring to FIG. 2A, DSL system 200 is illustrated. In DSL system 200, for simplicity, only downstream ADSL and VDSL signals are discussed. DSL system 200 comprises central office 202, link 204 leading to central office 202, cabinet 206, link 208 connecting central office 202 to cabinet 206, wire 213 connecting central office 202 to cabinet 206, wire 210 connecting central office 202 to ADSL customer premise equipment (CPE) 212 and wire 214 connecting plain old telephone service (POTS) and VDSL CPE 216 to cabinet 206. Wires 210, 213 and 214 are each a twisted pair of copper wire, i.e. a standard telephone wire.

Link 204 provides a digital data link to central office 202 for both the ADSL and the VDSL systems. From central office 202, DSL system 200 provides ADSL signals from central office 202 to CPE 212 over wire 210. Thus central office 202 is the source for ADSL signals. DSL system 200 also provides VDSL signals from cabinet 206.

Cabinet 206 is physically located between CPE 216 and central office 202. Link 208 provides a digital data link from central office 202 to cabinet 206 for the VDSL system. Downstream data received from central office 202 in link 208 is converted to VDSL signals. Wire 213 provides a link carrying POTS signals between central office 202 and cabinet 206. Both VDSL and POTS signals are provided to wire 214. Thus cabinet 206 is the source for VDSL signals. In a preferred embodiment, links 204 and 208 are optical links.

From cabinet 206, wires 210 and 214 are physically bound together in a binder group of wires and accordingly are adjacent one another for a portion of their length, referred to as the common loop length and indicated by bracket 218. DSL signals carried in wires 210 and 214 will interfere with one another along their common loop length. It will be appreciated that in other systems, VDSL data need not be provided from the same central office 202 as ADSL signals.

Figure 2B:
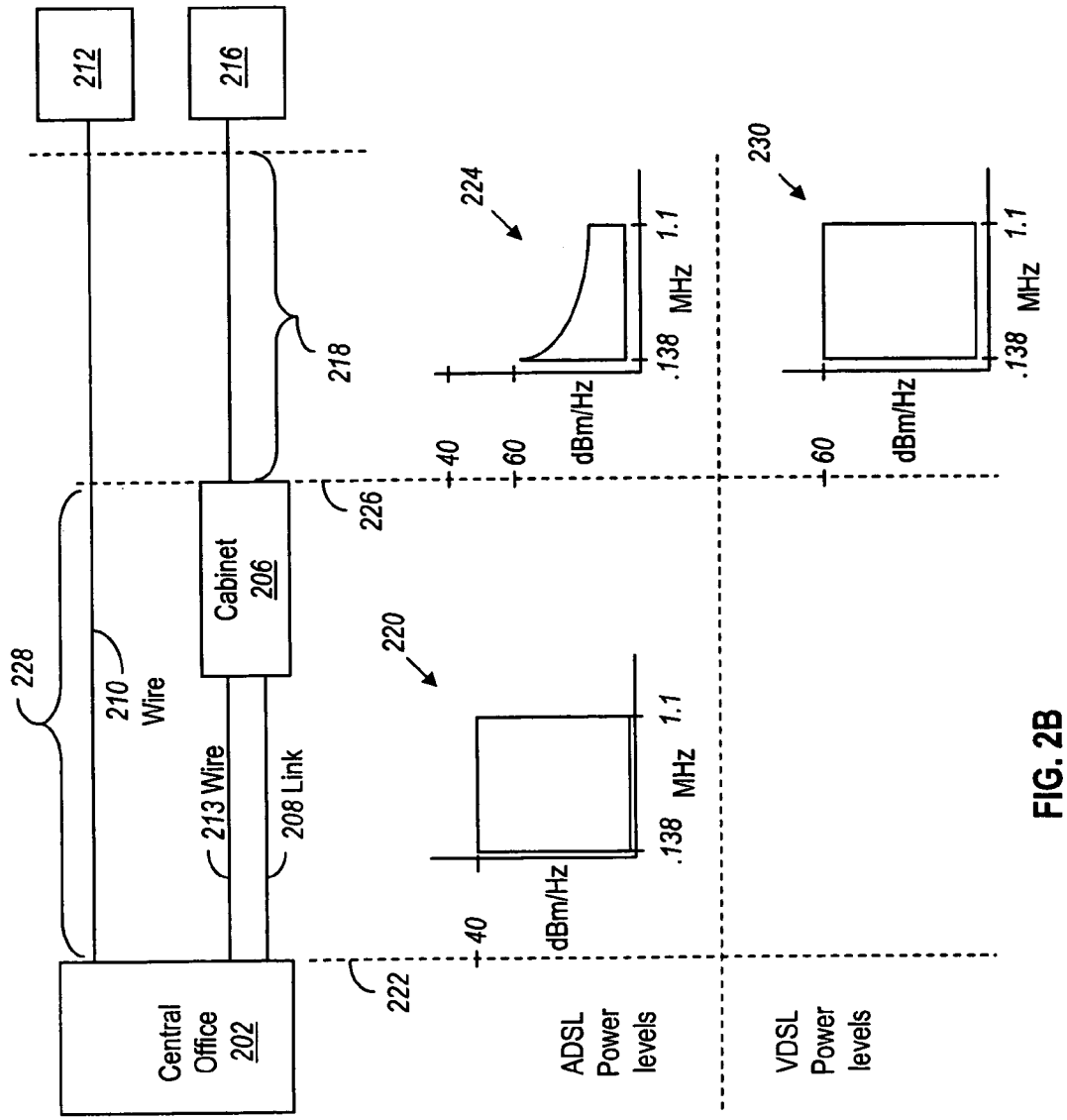
FIG. 2B is a block diagram of the DSL system of FIG. 2A including graphs of power levels of ADSL and VDSL signals therein.

Referring to FIG. 2B, graph 220 shows representative power levels of ADSL signals across the frequency range for ADSL signals at position 222 in DSL system 200. Since position 222 is at the source for ADSL signals, power levels are at the maximum −40 dBm/Hz.

Graph 224 shows representative power levels of ADSL signals across the frequency range for ADSL signals at position 226 in DSL system 200. Since position 226 is at a distance from central office 202, indicated by bracket 228, ADSL signals have attenuated with a larger attenuation occurring for signals using higher frequencies.

Graph 230 shows representative power levels of VDSL signals across the frequency range for VDSL signals at position 226 in DSL system 200. Since position 226 is at the source for VDSL signals, power levels are at the maximum −60 dBm/Hz.

Since ADSL signals have attenuated below −60 dBm/Hz in this DSL system 200, the power level for VDSL signals at position 226 as shown in graph 224, the full strength VDSL signals may cause unacceptable levels of crosstalk on the ADSL signals according to spectrum management standards. Crosstalk can be characterised as having two components, near-end crosstalk (NEXT) and the far-end crosstalk (FEXT). NEXT is the crosstalk from a disturbing pair which is attributed to a source that is local to the disturbed pair's receiver. FEXT is the crosstalk from a disturbing pair which is attributed to a source that is distant from the disturbed pair's receiver. The receiver in CPE 212 sees NEXT from the upstream transmission of CPE 216 and FEXT from the downstream VDSL transmitters of cabinet 206 and other ADSL transmitters of central office 202 sharing the same binder group. In the case of frequency division duplexed (FDD) DSL, such as ADSL and VDSL, where the upstream and downstream signals occupy different frequency bands, NEXT is generally not a problem. Also FEXT from other ADSL transceivers in central office 202 sharing the same binder group (known as "self FEXT") comply with spectrum management standards by default. However the FEXT from the stronger downstream transmission in cabinet 206 where the frequencies overlap between the ADSL downstream and VDSL downstream may introduce an unacceptable level of crosstalk impairment and is of concern here.

Figure 3:
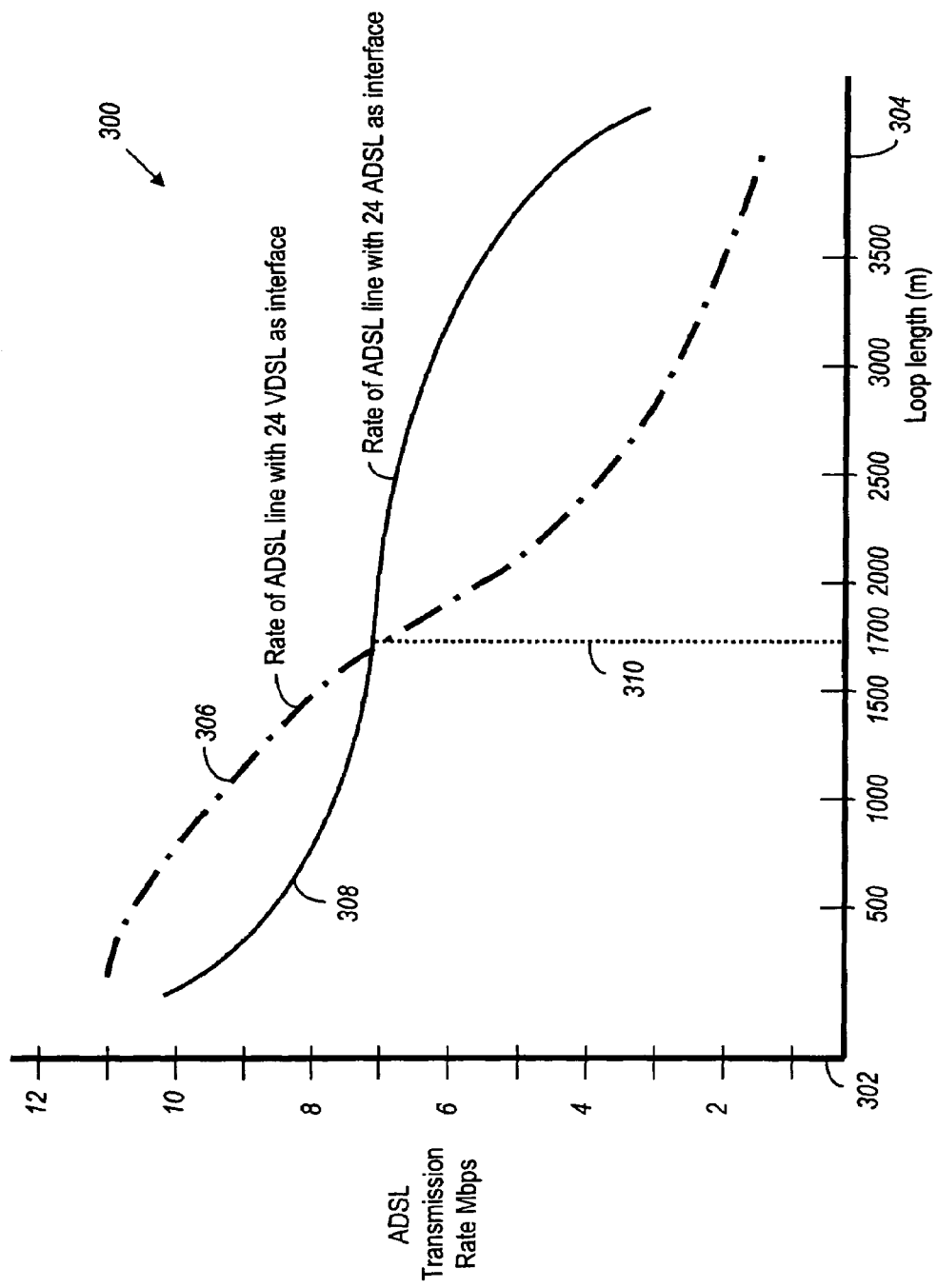
FIG. 3 is a graph of transmission rate of an ADSL signal experiencing far end crosstalk (FEXT) from ADSL signals and transmission rate of an ADSL signal experiencing FEXT from VDSL signals.

Referring to FIG. 3, graph 300 provides an example of the effect of VDSL signals on transmission rate of a reference ADSL signal. Graph 300 plots the transmission rate of the reference ADSL signal, transmission rate axis 302 measured in megabits per second (Mbps), against the length of wire 210 carrying the reference ADSL signal from central office 202 to CPE 212, loop length axis 304 measured in metres (m). For reference, the transmission rate of the reference ADSL signal is provided using chain-dotted line 306 with the interference of 24 ADSL signals deployed from central office 202.

Line 308 plots the transmission rate of the reference ADSL signal with the interference of 24 VDSL signals deployed from cabinet 206. The common loop length of wire 210 carrying the reference ADSL signal and the 24 wires 214 carrying the 24 VDSL signals is the last 200 m before the reference ADSL signal reaches ADSL CPE 216. This positioning of cabinet 206 in the last 200 m before the reference ADSL signal reaches ADSL CPE 216 represents the worst case scenario for FEXT interference. A worst case distance for FEXT is calculable since FEXT power is determined by two effects: coupling and loop attenuation. The coupling increases the FEXT with increasing common loop length and the attenuation decreases the FEXT with increasing common loop length. These two effects result in a maximum FEXT power at approximately 200 m according to standard models for FEXT.

As can be seen from graph 300, prior to position 310 where wire 210 is approximately 1700 m long, line 306 is above that of line 308, indicating a higher transmission rate when 24 VDSL signals interfere with the reference ADSL signal rather than 24 ADSL signals. This occurs since VDSL signals are originally transmitted at a lower power level than ADSL signals, starting at −60 dBm/Hz. The reference ADSL signal either has not attenuated below −60 dBm/Hz or has attenuated slightly below −60 dBm/Hz at cabinet 206, cabinet 206 located at approximately 1500 m along wire 210. At distances of more than 1700 m, the 24 VDSL signals produce more FEXT than 24 ADSL signals and hence lower the transmission rate of the reference ADSL signal, line 306 showing a lower transmission rate than line 308.

The T1.417 Spectrum Management Standard provides that VDSL signals must not interfere with ADSL signals more than a defined amount. Therefore, following the spectrum management standards, if cabinet 206 is more than a certain distance from central office 202, DSL system 200 may have to reduce the power level of VDSL signals for frequencies where both ADSL and VDSL signals are carried. The maximum distance that cabinet 206 is from central office 202 before power levels for VDSL signals may have to be reduced depends on the power spectral density of the VDSL used. The maximum is 1500 m in this example.

Standards currently allow ADSL signals deployed from central office 202 to provide a defined level of FEXT to other ADSL signals deployed from central office 202. The method of the embodiment uses an estimate of the FEXT allowed by the standards from a reference ADSL signal to determine the power level of VDSL signals transmitted from the cabinet.

Figure 5:
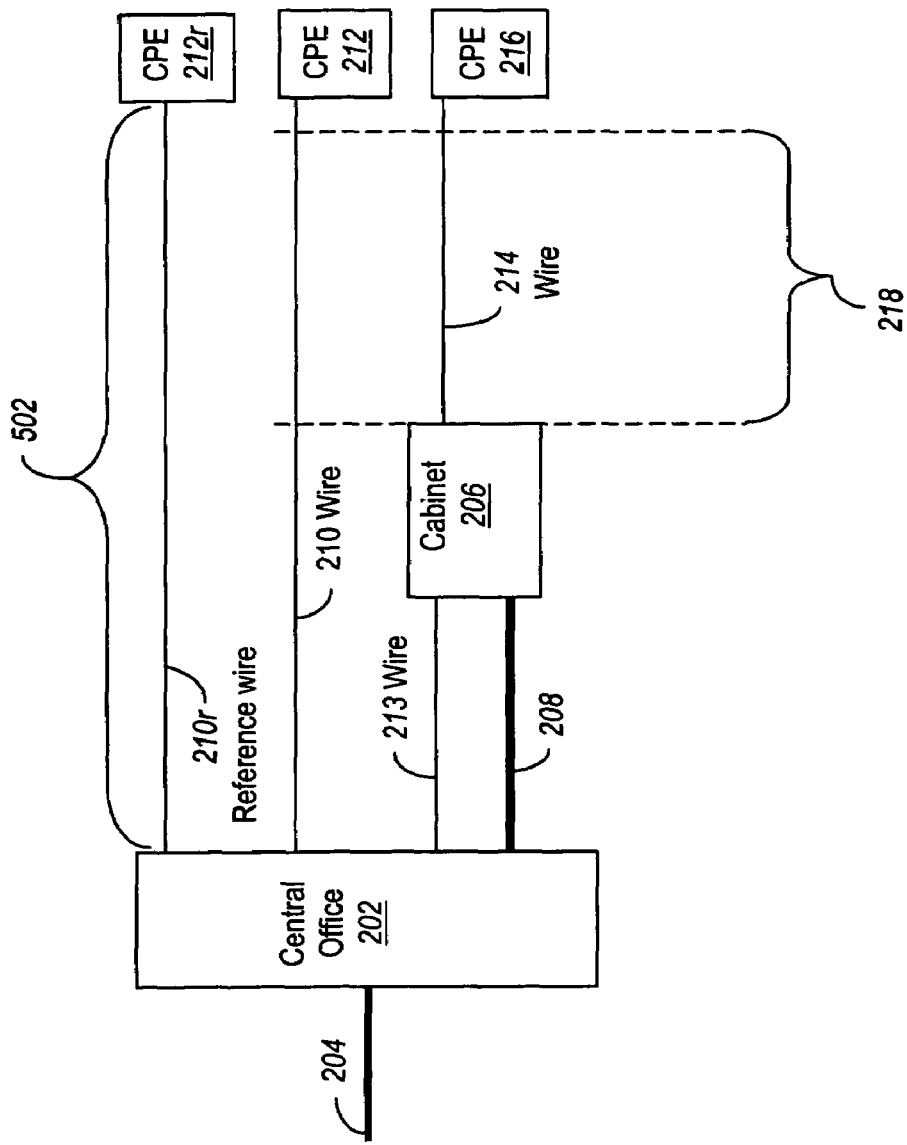
FIG. 5 is a block diagram of the DSL system of FIG. 2A including a reference wire carrying a reference ADSL signal.

Referring to FIG. 5, DSL system 200 is illustrated having central office 202, link 204 leading to central office 202, cabinet 206, link 208 connecting central office 202 to cabinet 206, wire 210 connecting central office 202 to CPE 212 and wire 214 connecting CPE 216 to cabinet 206. Also pictured in DSL system 200 is reference CPE 212r connected to central office 202 with reference wire 210r carrying reference ADSL signals. In the system illustrated, CPE 212 and CPE 212r are the same distance from central office 202. The common loop length of wire 210 and wire 210r is indicated by bracket 502 which is the length of wire 210. The reference signal carried on wire 210r may be simply a mathematical or theoretical model of a signal and need not necessarily be an actual signal. The common loop length of wire 210 and wire 214 is again indicated by bracket 218.

Briefly, a method of an embodiment determines the FEXT produced by a reference ADSL signal in wire 210r on another ADSL signal in a proximate wire 210 along the common loop length indicated by bracket 502. The FEXT calculation is based on the power level of the reference ADSL signal, and a common loop length interference factor. The common loop length interference factor is calculated based on the frequency of the ADSL signals, the common loop length of the wire 210r carrying the reference ADSL signal and the proximate wire 210 carrying the other ADSL signal, the number of additional xDSL signals providing interference to the other ADSL signal and any factors to account for the environment of the system such as characteristics of the wires and temperature. The determined FEXT is then used to establish a power level for the VDSL signal on wire 214 originating from cabinet 206 to provide a similar level of FEXT from the VDSL signal along its shorter common loop length with proximate wire 210, indicated by bracket 218. This is accomplished by substituting the shorter common loop length of bracket 218 for the longer common loop length of bracket 502 into the common loop length interference factor in the equations used to determine the level of FEXT and solving for the variable representing the power level of the DSL signal.

The method provides higher power levels for VDSL signals than certain prior art methods since the power level of the VDSL signal is calculated to provide a similar amount of FEXT over this shorter common loop length that the reference ADSL signal provides over its longer common loop length with wire 210.

The T1.417 Spectrum Management Standard provides an equation for calculating FEXT as a function of frequency, $ADSL_{FEXT}(f)$, from a reference ADSL signal introduced to another ADSL signal as follows:

$$ADSL_{FEXT}(f) = \quad (1)$$
$$Tx_{PSD}(f) + 10\log\left(K_{FEXT} \times L \times \left(\frac{x}{49}\right)^{0.6} \times f^2\right) - Atten(L, f)$$

where $Tx_{PSD}(f)$ is the transmission power spectral density or power level of the reference ADSL signal, $K_{FEXT}$ is a coupling constant for wires 210, L is the common loop length of wires 210 and 210r, x is the number of ADSL signals in adjacent wires 210, f is the frequency of the signal and Atten is an attenuation function. Every type of cable has a certain nominal attenuation per unit length, frequency dependent, which is specified at a certain temperature. Therefore Atten is expressed as a function of common loop length, L, and frequency, f.

$K_{FEXT}$ represents the characteristics of wire 210 and is widely accepted to be a certain nominal value. As both ADSL signals in wires 210 and 210r are deployed from central office 202 and terminate at CPE 212 and CPE 212r respectively, the common loop length L is the length of wire 210, indicated by bracket 502. For the embodiment, it is assumed that only one other ADSL signal is transmitted over a wire 210r adjacent to the first ADSL signal and, accordingly, x=1. It is also assumed that the binder group has 50 twisted copper pairs.

After $ADSL_{FEXT}(f)$ is calculated, the method uses a re-arranged equation (1) to solve for the transmission power level $Tx_{PSD}(f)$ of the DSL signal to provide such $ADSL_{FEXT}(f)$ resulting in the equation:

$$Tx_{PSD}(f) = \quad (2)$$
$$ADSL_{FEXT}(f) - 10\log\left(K_{FEXT} \times L \times \left(\frac{1}{49}\right)^{0.6} \times f^2\right) + Atten(L, f)$$

If $ADSL_{FEXT}(f)$ and the other variables and constants are known, equation (2) provides a calculation of the power level of the reference ADSL signal, $Tx_{PSD}(f)$, to provide the given $ADSL_{FEXT}(f)$.

However, as VDSL signals are deployed from cabinet 206 and not central office 202, the common loop length or $L_c$, indicated by bracket 218, is shorter than the above L, indicated by bracket 502, used in equations (1) and (2). Substituting the common loop length between wire 210 and wire 214, $L_c$, into equation (2) provides an equation based on the frequency for the power level of the VDSL signal, $VDSL_{PSD}(f)$, to provide the given $ADSL_{FEXT}(f)$. The new equation for $VDSL_{PSD}(f)$ is as follows:

$$VDSL_{PSD}(f) = \quad (3)$$
$$ADSL_{FEXT}(f) - 10\log\left(K_{FEXT} \times L_c \times \left(\frac{1}{49}\right)^{0.6} \times f^2\right) + Atten(L_c, f)$$

where $ADSL_{FEXT}(f)$ is the calculated $ADSL_{FEXT}(f)$ from the reference ADSL signal calculated from equation (1). Since $L_c$ is smaller than L, the second term of equation (3) is smaller than the second term of equation (2) which increases the value of $VDSL_{PSD}(f)$ over $Tx_{PSD}(f)$. In effect, the power level of a VDSL signal for a given frequency is calculated to provide a similar level of FEXT over the shorter common loop length $L_c$ that an ADSL signal would provide over the longer common loop length L. Hence the power level of a VDSL signal can be boosted to $VDSL_{PSD}(f)$ and only interfere with the ADSL signal as much as another ADSL signal deployed from central office 202. Generally, this provides a VDSL signal having a higher power level than known prior art methods of establishing power levels for VDSL signals.

Figure 6A:
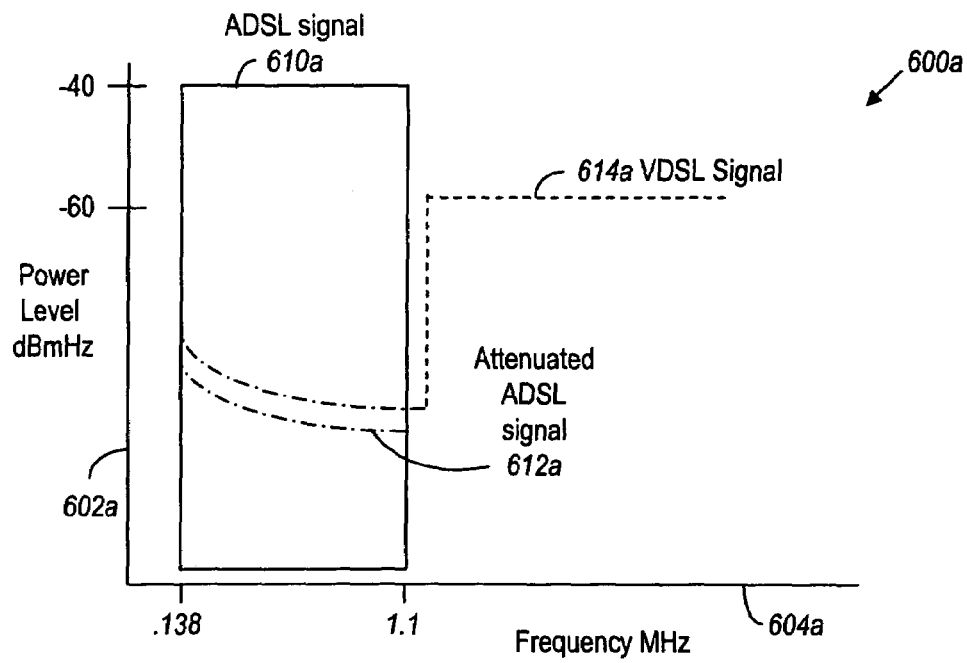
FIG. 6A is a graph illustrating power levels of ADSL signals sent from a central office, power levels of the sent ADSL signals after being attenuated and power levels of VDSL signals sent from a cabinet established using a first method of the embodiment.

Referring to FIG. 6A, graph 600a shows the power levels of ADSL and VDSL signals using the above method to establish VDSL power levels. Graph 600a plots power levels, measured in dBm/Hz, on power level axis 602a, against frequencies, measured in MHz, on frequency axis 604a, for both ADSL and VDSL signals. Power levels of ADSL signals sent from central office 202 is shown by solid line 610a, power levels of attenuated ADSL signals at cabinet 206 is shown by chain-dotted line 612a and power levels of VDSL signals at cabinet 206 is shown by dashed line 614a.

As can be seen from graph 600a, the calculation of $VDSL_{PSD}(f)$ provided above establishes power levels for VDSL signals higher than that of the attenuated ADSL signals at cabinet 206. This is shown by dashed line 614a above chain-dotted line 612a in frequencies where ADSL and VDSL signals overlap.

Figure 6B:
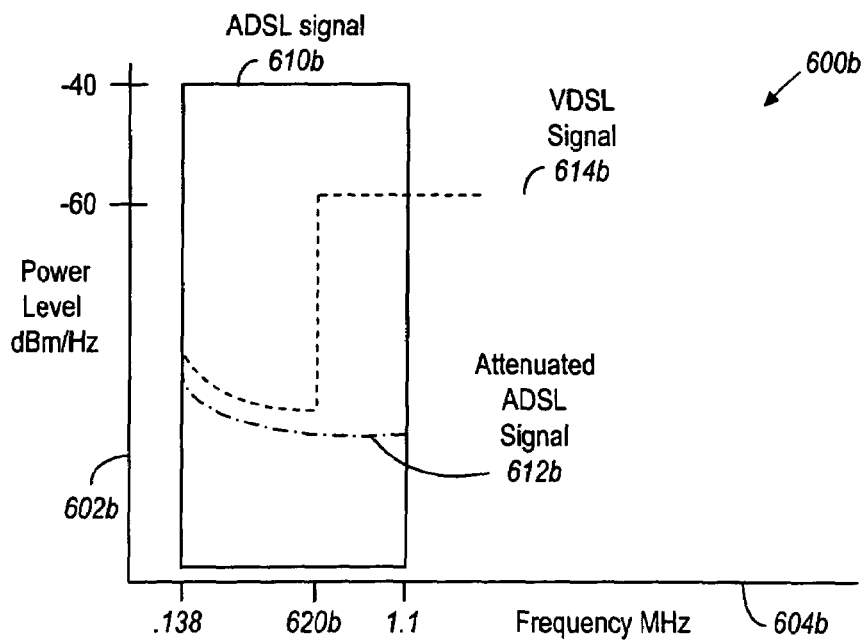
FIG. 6B is a graph illustrating power levels of ADSL signals sent from a central office, power levels of the sent ADSL signals after being attenuated and power levels of VDSL signals sent from a cabinet established using a second method of the embodiment.

Referring to FIG. 6B, graph 600b shows the power levels of ADSL and VDSL signals using the above method to establish VDSL power levels. Graph 600b plots power levels, measured in dBm/Hz, on power level axis 602b, against frequencies, measured in MHz, on frequency axis 604b, for both ADSL and VDSL signals. Strength of ADSL signals output from central office 202 is shown by solid line 610b, strength of attenuated ADSL signals at cabinet 206 is shown by chain-dotted line 612b and strength of VDSL signals at cabinet 206 is shown by dashed line 614b.

FIG. 6B illustrates a second method of the embodiment for use when wire 210 carrying ADSL signals is relatively long, i.e. in the order of 4 to 5 km. CPE 212 may be at such a distance from central office 202 that power levels for ADSL signals having higher frequencies are reduced below a usable level. Therefore, cabinet 206 can transmit VDSL signals using these frequencies at their maximum power level and not interfere with ADSL signals. Point 620b, illustrated in graph 600b, marks the frequency after which ADSL signals having higher frequencies are attenuated below a usable level for this distance from central office 202. Graph 600b therefore shows VDSL signals transmitted at full power, −60 dBm/Hz, for higher frequencies than the frequency at point 620b along frequency axis 604b. Prior to point 620b, the method of the embodiment calculates the power level as illustrated in graph 600a of FIG. 6A. This is shown by the power level of VDSL signals in dashed line 614b similar to dashed line 614a in graph 600a for the overlapping frequencies up to point 620b along frequency axis 604b.

It will be appreciated that the method of the embodiment is preferably used in cabinets 206 which support transmitting VDSL signals at power levels that vary with frequency. Control of power levels for the cabinet 206 may be controlled via operating software for the cabinet 206 or may be manually adjusted at the hardware level on the circuit card for the cabinet 206. The cabinet 206 may also have measuring devices located therein which detect and report on signals carried on lines from the cabinet 206, such as FEXT levels.

In the embodiment, cabinet 206 establishes the power level for transmitting VDSL signals to CPE 216. In the embodiment, cabinet 206 uses a manual system for establishing power levels.

When deploying VDSL from cabinet 206 in the embodiment, an operator manually establishes power levels of VDSL signals. The method of deployment of the embodiment sets the power level for VDSL signals, $VDSL_{PSD}(f)$, for all binder groups at cabinet 206. The distance from central office 202 to cabinet 206 is either estimated, measured or known. This distance is then converted into the equivalent working length as per the T1.417 standard which can be used to calculate the value of L. $K_{FEXT}$ and the Atten function used are based on 26 AWG PIC cable characteristics used in the T1.417 standard. $L_c$ is set to the worst case 200 m. These numbers are then substituted into equations (1)–(3) to provide the power level for VDSL signals, $VDSL_{PSD}(f)$, transmitted from cabinet 206.

As a further variation, the method of the embodiment may be employed separately for each port in cabinet 206 and use the estimated or measured values for $ADSL_{FEXT}(f)$, L, $L_c$, $K_{FEXT}$ and the Atten function at cabinet 206 to calculate $VDSL_{PSD}(f)$. It will be appreciated that the method of the embodiment may use estimated, measured values or worst case values for $ADSL_{FEXT}(f)$, L, $L_c$, $K_{FEXT}$ and the Atten function to calculate $VDSL_{PSD}(f)$.

Figure 8:
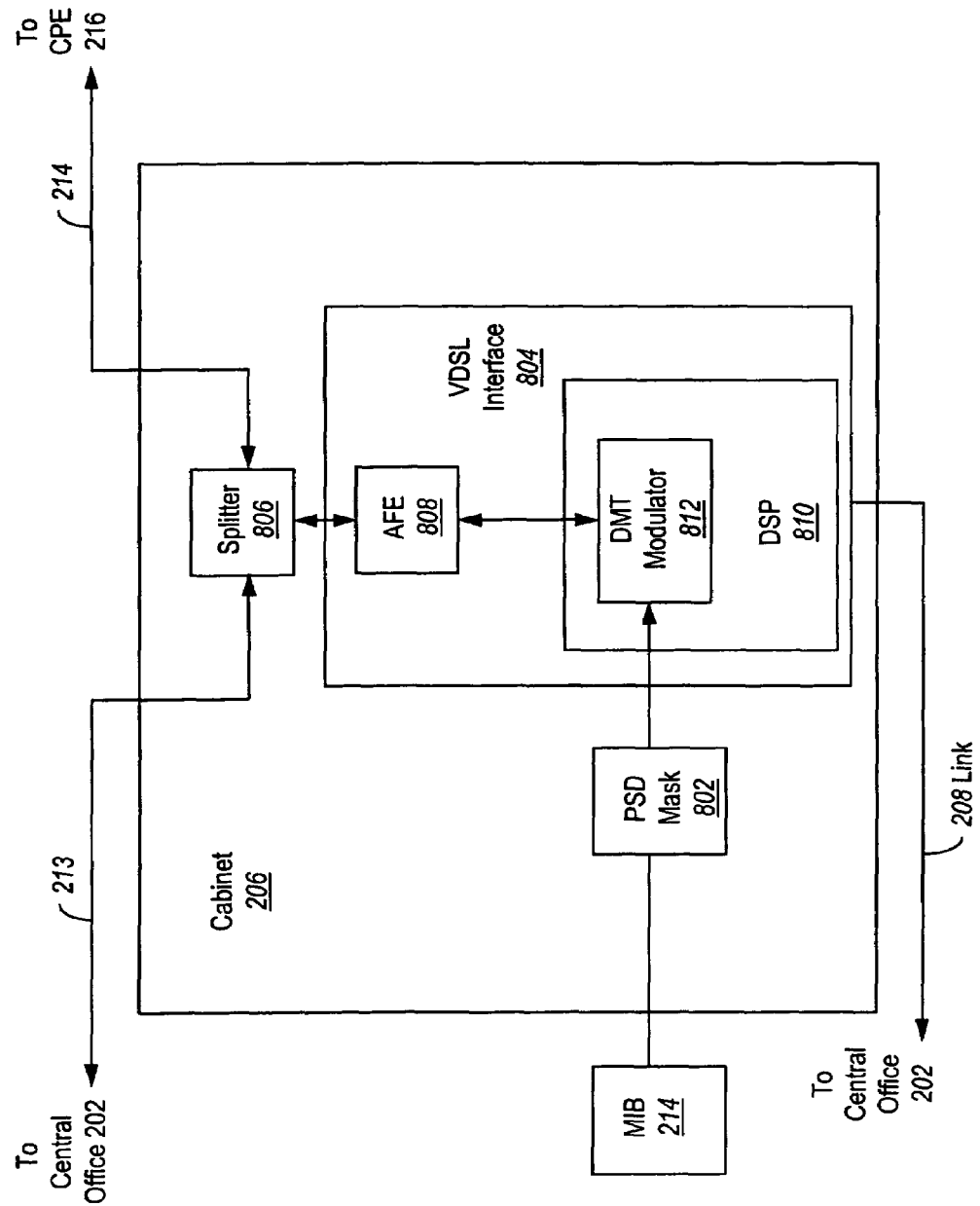
FIG. 8 is a block diagram of an exemplary arrangement of components of the cabinet of FIG. 5.

Referring to FIG. 8, an exemplary arrangement for cabinet 206, where the power levels of the VDSL signals may be set, is shown therein. Cabinet 206 includes power spectral density (PSD) mask 802, VDSL interface 804 and splitter 806. PSD mask 802 connects to VDSL interface 804 which in turn connects to splitter 806. Splitter 806 provides an interface for monitoring and inserting signals to and from wire 214 and connects POTS signals on wire 213 with wire 214. VDSL interface 804 provides such monitoring and interface functionalities for digital signals arriving at cabinet 206 over link 208. VDSL interface 804 includes analog front-end (AFE) 808 and digital signal processor (DSP) 810. Splitter 806 connects to AFE 808 which in turn connects to discrete multi-tone (DMT) modulator 812 within digital signal processor (DSP) 810. PSD mask 802 of cabinet 206 also connects to management information base (MIB) 814 outside of cabinet 206.

As detailed above, using aspects of an embodiment, an operator may first determine power levels for VDSL signals to be transmitted over wire 214 to CPE 216. This may be done using techniques known in the art, such as connecting a measuring device to an appropriate top point (not shown) to wire 214. Once the power level is determined, the operator may configure PSD mask 802 using MIB 814 to provide such power levels.

When digital signals from central office 202 that are to be converted to VDSL signals arrive at cabinet 206, PSD mask 802 interacts with VDSL interface 804 to transmit the VDSL signals over wire 214 at the determined power levels. Digital signals first arrive at cabinet 206 at VDSL interface 804 over link 208. The digital signals are provided to DMT modulator 812 in DSP 810. DMT modulator 812 encodes and compresses the digital signals as VDSL signals for transmission over wire 214. The VDSL signals are then sent to AFE 808 at the power level determined by PSD mask 802. AFE 808 converts the digital signals to analog and cabinet 206 transmits them through splitter 806 and over wire 214 to CPE 216. Splitter 806 separates the combined upstream VDSL and POTS signals on wire 214 into VDSL signals sent to VDSL interface 804 and POTS signals sent to wire 213. It will be appreciated that other arrangements of cabinet 206 are possible.

The method of the embodiment for boosting the power level of VDSL signals still results in less FEXT than the maximum allowed by spectrum management standards. As such, the method of the embodiment may be expanded to calculate $VDSL_{PSD}(f)$ and then use this base level to boost the power level to the produce the maximum FEXT according to spectrum management standards.

Apart from VDSL signals, the method of the embodiment may also be used for any cabinet deployed xDSL signals that have overlapping frequencies with other xDSL signals. For example, a first ADSL signal is deployed from central office 202 and a second ADSL signal is deployed from cabinet 206. In such a case, the common loop length $L_c$ of the wires on which the first and the second ADSL signals are transmitted is shorter than the common loop length L used to calculate FEXT from a reference ADSL signal interfering with the first ADSL signal. This produces a larger value for the calculated $VDSL_{PSD}(f)$ than $Tx_{PSD}(f)$. In effect, the power level of the second ADSL signal can be increased so that it provides the same level of FEXT over the shortened common loop length $L_c$ that the reference ADSL signal would provide to the first ADSL signal over the longer common loop length L. Hence the power level of the second ADSL signal can be boosted to the $VDSL_{PSD}(f)$ calculated using $L_c$ and only interfere with the first ADSL signal as much as the reference ADSL signal deployed from central office 202.

It will be appreciated that in other embodiments, other models and methods may be used to determine FEXT. For example, other modelling equations may be used in lieu of equation (1). Further, an actual FEXT measurement may be used to provide the $ADSL_{FEXT}(f)$. Similarly, it will be appreciated that in other embodiments the method of determining the power level for the VDSL signal may utilize a different method. For example, an equation differing from equation (2) which still produces a power level based on a determined FEXT may be used. It will be further appreciated that the method may be used in other systems which transmit signals which are not necessarily xDSL signals in an environment where interference between signals exists and must be considered.

Figure 4A:
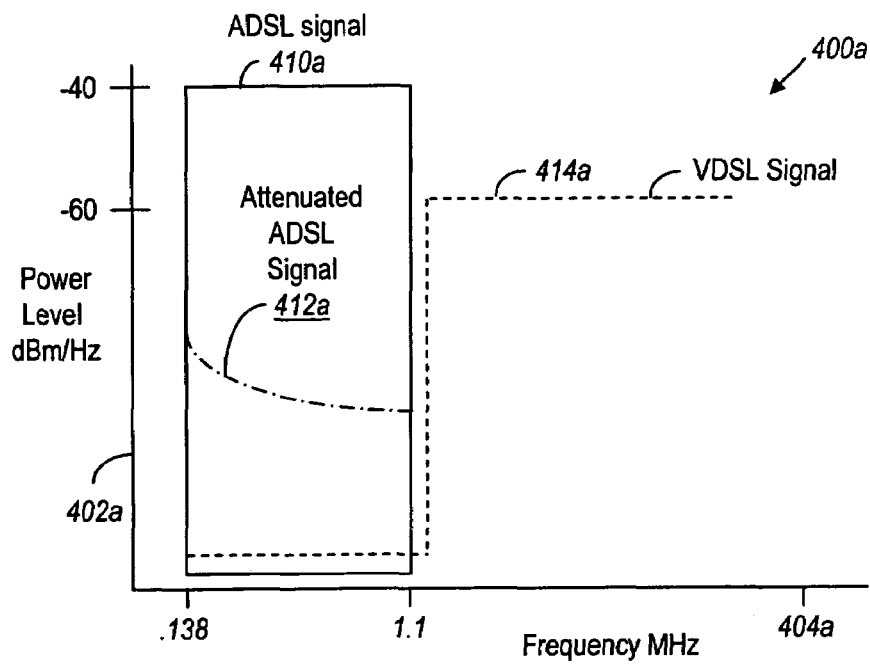
FIG. 4A is a graph illustrating power levels of ADSL signals sent from a central office, power levels of the sent ADSL signals after being attenuated and power levels of VDSL signals sent from a cabinet established using a first prior art method.
Figure 4B:
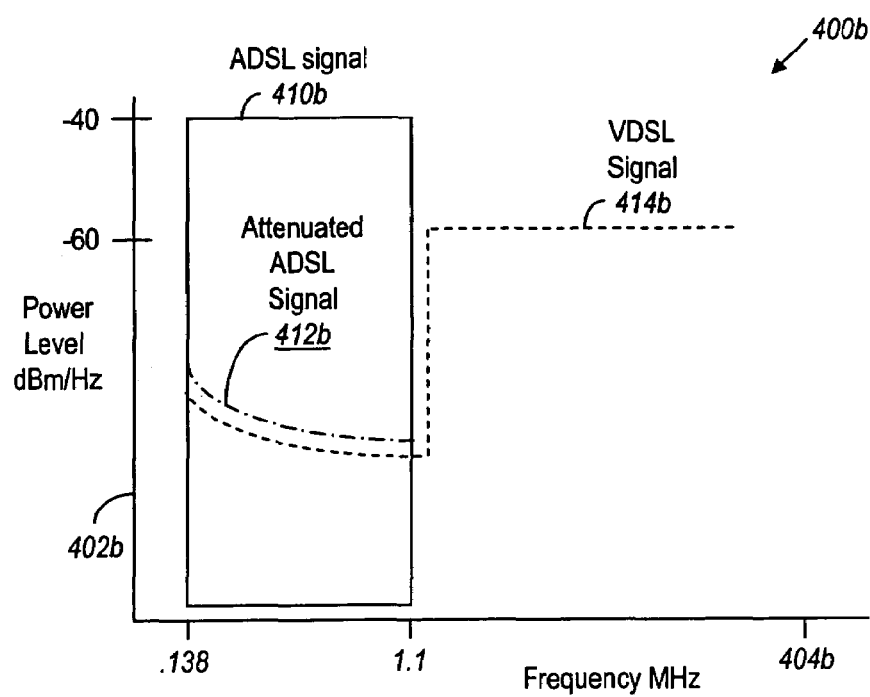
FIG. 4B is a graph illustrating power levels of ADSL signals sent from a central office, power levels of the sent ADSL signals after being attenuated and power levels of VDSL signals sent from a cabinet established using a second prior art method.
Figure 4C:
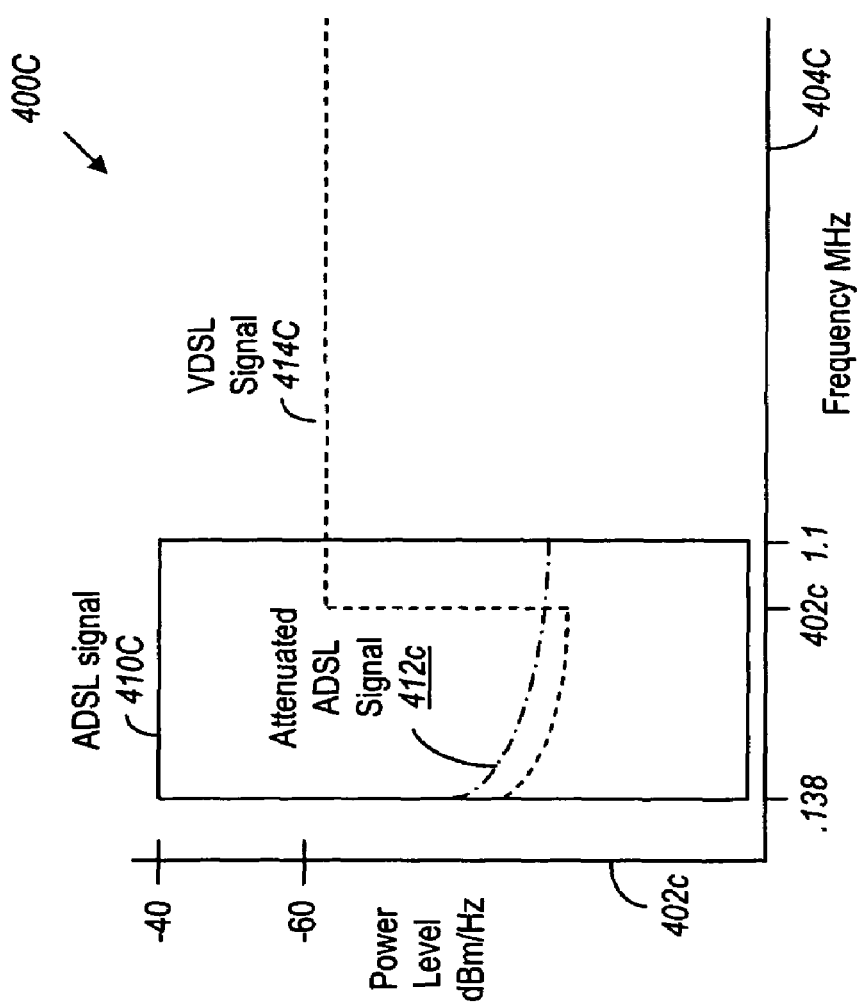
FIG. 4C is a graph illustrating power levels of ADSL signals sent from a central office, power levels of the sent ADSL signals after being attenuated and power levels of VDSL signals sent from a cabinet established using a third prior art method.

The embodiments provide an improved performance over known prior art methods of establishing a power level of VDSL signals deployed from cabinet 206. Some prior art methods are illustrated in FIGS. 4A–4C which show graphs 400a–i c. Graphs 400a–c plot power levels, measured in dBm/Hz on power level axes 402a–c, against frequencies, measured in MHz, on frequency axes 404a–c, for both ADSL and VDSL signals. Power levels of ADSL signals sent from central office 202 are shown by solid lines 410a–c, power levels of attenuated ADSL signals at cabinet 206 are shown by chain-dotted lines 412a–c and power levels of VDSL signals at cabinet 206 are shown by dashed lines 414a–c.

One prior art method, illustrated in FIG. 4A, is to not transmit VDSL signals in the frequencies used for ADSL. This is shown in graph 400a where the power level of VDSL signals in dashed line 414a is distinct from and well below the power level of ADSL signals in chain-dotted line 412a for the overlapping frequencies. This method limits the transmission rate of VDSL services since lower frequencies, i.e. the ones where the overlap occurs, are capable of carrying more data because of their lower attenuation levels.

As transmissions at lower frequencies have better attenuation characteristics than transmissions at higher frequencies at longer transmission distances, it is preferable to use a higher power level of VDSL signals in the frequencies where VDSL signals overlap with ADSL signals while keeping FEXT from those VDSL signals within acceptable standards. This provides a higher VDSL transmission rate while minimally affecting ADSL transmission rates. There are variations on this concept for which details are provided below.

Another prior art method illustrated in FIG. 4B matches power level of VDSL signals to the power level of attenuated ADSL signals at cabinet 206. This is shown by VDSL dashed line 414b matching the power level of ADSL chain-dotted line 412b for the overlapping frequencies.

As with the second method of the embodiment illustrated in FIG. 6B, FIG. 4C illustrates a prior art method used when wire 210 carrying ADSL signals is relatively long, i.e. in the order of 4 to 5 km. Point 420c along frequency axis 404c, illustrated in graph 400c, marks the frequency after which ADSL signals having higher frequencies are attenuated below a usable level at this distance from central office 202. Graph 400c therefore shows VDSL signals transmitted at full power, −60 dBm/Hz, at higher frequencies than the frequency at point 420c along frequency axis 404c. Prior to point 420c, the prior art method attempts to match the power level of VDSL signals to the power level of attenuated ADSL signals at cabinet 206. This is shown by the power level of VDSL signals in dashed line 414c matching the power level of ADSL signals in chain-dotted line 412c for the overlapping frequencies up to point 420c along frequency axis 404c.

Figure 7A:
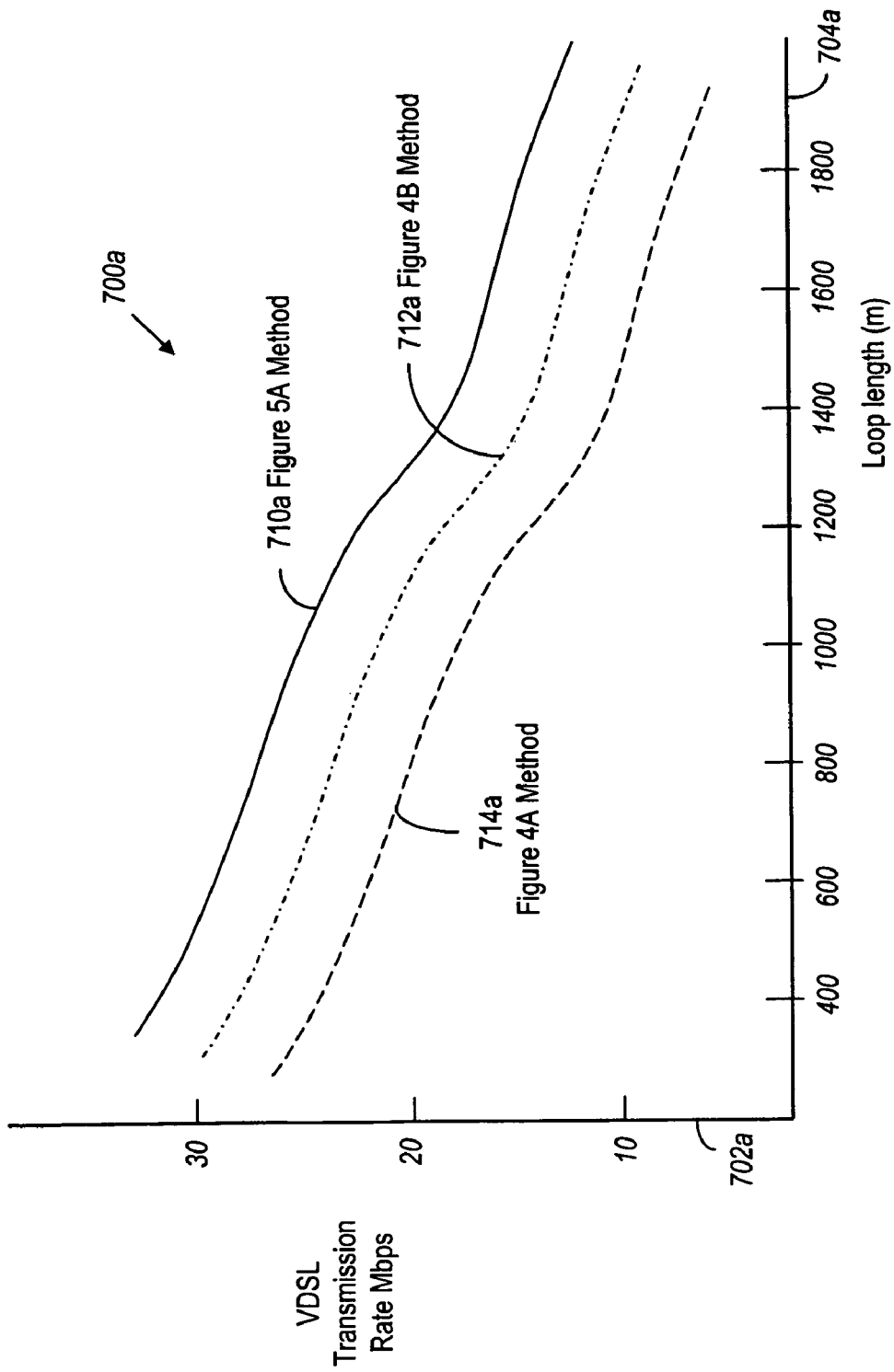
FIG. 7A is a graph of transmission rates of VDSL signals when transmitted at the power level calculated using the first method of the embodiment and transmission rates of VDSL signals when transmitted at power levels calculated using methods of the prior art.
Figure 7B:
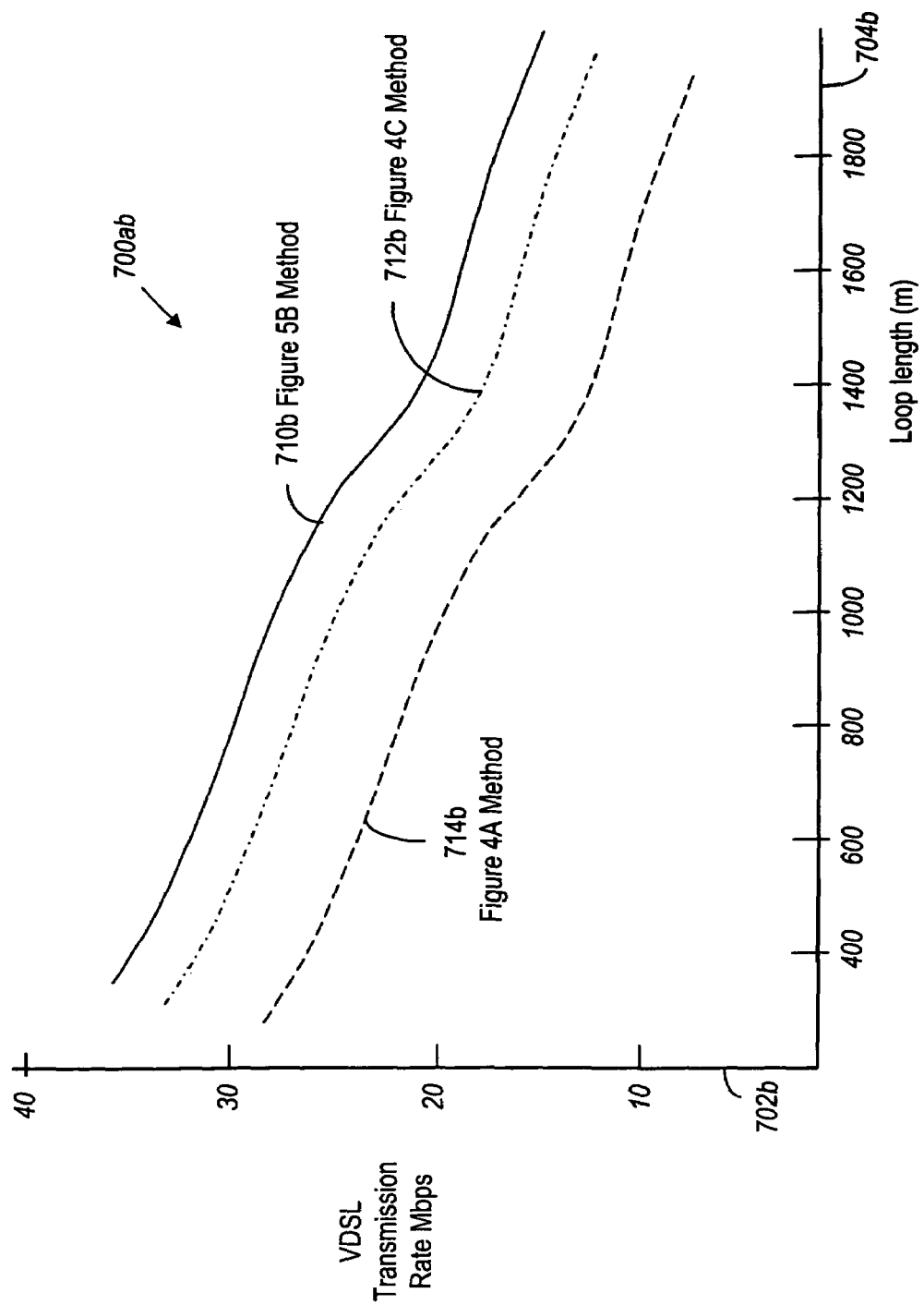
FIG. 7B is a graph of transmission rates of VDSL signals when transmitted at the power level calculated using the second method of the embodiment and transmission rates of VDSL signals when transmitted at power levels calculated using methods of the prior art.

Meanwhile, the embodiment provides improved VDSL transmission rates than the described prior art methods. Referring to FIGS. 7A and B, graphs 700a–b compare the transmission rates of VDSL signals with power levels established according to the method of the embodiment with that of prior art methods. Graphs 700a–b plot transmission rates along transmission rate axes 702a–b, measured in Mbps, against length of wire 214 along loop length axes 704a–b, measured in metres (m). In these examples, the common loop length between wire 214 and 210 is assumed to be the length of wire 214 and so axes 704a–b also represent the common loop length between wire 214 and wire 210. However, the power level for the modelled VDSL signals was set using the worst case common loop length $L_c$ of 200 m substituted into equation (3).

In graph 700a, cabinet 206 is represented as being 3.3 km away from central office 202. Solid line 710a represents the transmission rates of VDSL signals for varying loop lengths for wire 214 using the power levels of the method of the embodiment as illustrated in FIG. 6A. Chain-dotted line 712a represents the transmission rates of VDSL signals for varying loop lengths for wire 214 using the power levels of the prior art method illustrated in FIG. 4B where the power levels match that of attenuated ADSL signals. Dashed line 714a represents the transmission rates of VDSL signals for varying loop lengths for wire 214 using the power levels of the prior art method illustrated in FIG. 4A where VDSL signals do not use the frequencies overlapping with ADSL signals.

In graph 700a, solid line 710a shows that the transmission rate for VDSL signals using the method of the embodiment illustrated in FIG. 6A is above that of the prior art methods represented by chain-dotted line 712a and dashed line 714a for all loop lengths of wire 214.

In graph 700b, cabinet 206 is represented as being 5 km away from central office 202. Solid line 710b represents the transmission rates of VDSL signals for varying loop lengths for wire 214 using the power levels of the method of the embodiment as illustrated in FIG. 6B. Chain-dotted line 712b represents the transmission rates of VDSL signals for varying loop lengths for wire 214 using the power levels of the prior art method illustrated in FIG. 4C. FIG. 4C illustrates the prior art method where the power levels match that of attenuated ADSL signals prior to a certain frequency and are then transmitted at full power for higher frequencies. Dashed line 714b represents the transmission rates of VDSL signals for varying loop lengths for wire 214 using the power levels of the prior art method illustrated in FIG. 4A where VDSL signals do not use the frequencies overlapping with ADSL signals.

In graph 700b, solid line 710b shows that the transmission rate for VDSL signals using the method of the embodiment illustrated in FIG. 6B is above that of the prior art methods represented by chain-dotted line 712b and dashed line 714b for all loop lengths of wire 214.

It is noted that those skilled in the art will appreciate that various modifications of detail may be made to the present embodiment, all of which would come within the scope of the invention.

I claim:

1. A method of establishing a transmission power level for signals transmitted in a conductor in an environment where signal interference is present between said signals in said conductor and separate signals carried in a proximate conductor, said method comprising the steps of:

determining a reference signal interference level at an end of said proximate conductor from a reference signal capable of being propagated from an opposing end of said proximate conductor; and determining a transmission power level for said signals to provide a signal interference level based on said reference signal interference level; and wherein said transmission power level is determined utilizing a transmission power level function that is dependent on frequency of said signals, and said transmission power level function is expressed as:

$$VDSL_{PSD}(f) = ADSL_{FEXT}(f) - 10\log\left(K_{FEXT} \times L_c \times \left(\frac{1}{49}\right)^{0.6} \times f^2\right) + Atten(L_c, f)$$

where $VDSL_{PSD}(f)$ is said transmission power level for said signals, $L_c$ is a common loop length of said proximate conductor with said conductor carrying said signals. $K_{FEXT}$ is a coupling constant for said conductor, f is said frequency of said signals, Atten is a first attenuation function for signals propagated through said conductor dependent on $L_c$ and f and $ADSL_{FEXT}(f)$ is said reference signal interference level.

2. The method of establishing a transmission power level for signals transmitted in a conductor as claimed in claim 1, said method further comprising the step of: transmitting said signals at said transmission power level.

3. The method of establishing a transmission power level for signals transmitted in a conductor as claimed in claim 2, wherein said signals, said separate signals and said reference signal are xDSL signals.

4. The method of establishing a transmission power level for signals transmitted in a conductor as claimed in claim 3, wherein said separate signals and said reference signal are ADSL signals and said signals are one of (a) VDSL signals and (b) ADSL signals.

5. The method of establishing a transmission power level for signals transmitted in a conductor as claimed in claim 4, wherein said step of determining said transmission power level further utilizes:
 a first common loop length interference factor, said first common loop length interference factor including a common loop length of said proximate conductor with said conductor carrying said signals; and
 a first attenuation factor for signals propagated through said conductor.

6. The method of establishing a transmission power level for signals transmitted in a conductor as claimed in claim 5, wherein said step of determining said reference signal interference level further utilizes:
 a transmission power level for said reference signal;
 a second common loop length interference factor, said second common loop length interference factor including a common loop length of said proximate conductor with a conductor for carrying said reference signal; and
 a second attenuation factor for said reference signal capable of being propagated through said conductor for carrying said reference signal.

7. The method of establishing a transmission power level for signals transmitted in a conductor as claimed in claim 6, wherein said common loop length of said proximate conductor with said conductor carrying said signals, $L_c$, provides an estimation of a worst case common loop length.

8. The method of establishing a transmission power level for signals transmitted in a conductor as claimed in claim 7, wherein said reference signal interference level, $ADSL_{FEXT}$ (f), is calculated using the equation:

$$ADSL_{FEXT}(f) = Tx_{PSD}(f) + 10 \log\left(K_{FEXT} \times L \times \left(\frac{1}{49}\right)^{0.6} \times f^2\right) + Atten(L, f)$$

where $Tx_{PSD}(f)$ is a power level of said reference signal, L is a common loop length of said proximate conductor with a conductor for carrying said reference signal and Atten is a second attenuation function for said reference signal capable of being propagated through said conductor for carrying said reference signal dependent on L and f.

9. The method of establishing a transmission power level for signals transmitted in a conductor as claimed in claim 8, wherein said reference signal is a theoretical reference signal.

10. The method of establishing a transmission power level for signals transmitted in a conductor as claimed in claim 9, wherein said conductor and said proximate conductor are wires carrying electrical signals.

11. The method of establishing a transmission power level for signals transmitted in a conductor as claimed in claim 10, wherein said conductor and said proximate conductor are in a same binder group.

12. The method of establishing a transmission power level for signals transmitted in a conductor as claimed in claim 11, wherein said conductor and said proximate conductor are each a twisted pair of copper wire.

13. A power level transmission controller for establishing a transmission power level for signals transmitted in a conductor in an environment where signal interference is present between said signals in said conductor and separate signals carried in a proximate conductor, said transmitting controller device comprising:
 a transmission power level mask for regulating a transmission power level of said signals transmitted in said conductor, said transmission power level to provide a signal interference level to said separate signals in said proximate conductor based on a reference signal interference level at an end of said proximate conductor from a reference signal capable of being propagated from an opposing end of said proximate conductor
wherein said transmission power level is determined utilizing a transmission power level function that is dependent on frequency of said signals and is expressed as:

$$VDSL_{PSD}(f) = ADSL_{FEXT}(f) - 10 \log\left(K_{FEXT} \times L_c \times \left(\frac{1}{49}\right)^{0.6} \times f^2\right) + Atten(L_c, f)$$

where $VDSL_{PSD}(f)$ is said transmission power level for said signals, $L_c$ is a common loop length of said proximate conductor with said conductor carrying said signals, $K_{FEXT}$ is a coupling constant for said conductor, f is said frequency of said signals, Atten is a first attenuation function for signals propagated through said conductor dependent on $L_c$ and f and $ADSL_{FEXT}(f)$ is said reference signal interference level.

14. The power level transmission controller as claimed in claim 13, said power level transmission controller further comprising:
 a digital signal processor in communication with said transmission power level mask for transmitting said signals at said transmission power level.

15. The power level transmission controller as claimed in claim 14, wherein said signals, said separate signals and said reference signal are xDSL signals.

16. The power level transmission controller as claimed in claim 15, wherein said separate signals and said reference signal are ADSL signals and said signals are one of (a) VDSL signals and (b) ADSL signals.

17. The power level transmission controller as claimed in claim 16, wherein said reference signal interference level, $ADSL_{FEXT}(f)$, is calculated using the equation:

$$ADSL_{FEXT}(f) = Tx_{PSD}(f) + 10 \log\left(K_{FEXT} \times L \times \left(\frac{1}{49}\right)^{0.6} \times f^2\right) + Atten(L, f)$$

where $Tx_{PSD}(f)$ is a power level of said reference signal, L is a common loop length of said proximate conductor with a conductor for carrying said reference signal and Atten is a second attenuation function for said reference signal capable of being propagated through said conductor for carrying said reference signal dependent on L and f.

18. A method of adjusting a power spectral density (PSD) of an xDSL signal transmitted over a cable, the cable having local loops for transmission of the xDSL signal and a further xDSL signal, the xDSL and further xDSL signals having a region of overlapping frequency bands, comprising:
 transmitting the further xDSL signal over a first of said loops from a central terminal unit to a first remote terminal unit;

determining a far-end cross talk (FEXT) interference present in the further xDSL signal during said transmitting the further xDSL signal over said first of said loops;

inserting the xDSL signal over a second of said loops at a neighbourhood terminal unit for transmission to a second remote terminal unit;

determining a common loop length as the region of the first of said loops that overlaps with the second of said loops; and adjusting the FEXT interference to generate an adjusted FEXT interference value using at least the common loop length; and maintaining the power spectral density (PSD of the xDSL signal in the region outside the overlapping frequency bands and adjusting the (PSD) of the xDSL signal in the region of overlapping frequency bands utilizing the common loop length, the distance from the neighborhood terminal unit to the central terminal unit and the adjusted FEXT interference value.

19. The method according to claim 18, wherein the further xDSL signal is an ADSL signal and the xDSL signal is a VDSL signal.

20. The method according to claim 18, wherein the xDSL signal and the further xDSL signal are ADSL signals.

21. The method of claim 18, further comprising:

determining a worst case length of the common loop length corresponding to a maximum FEXT power in the further xDSL signal; and adjusting the common loop length to be different from the worst case length.

22. The method of claim 18, wherein:

the step of determining a FEXT interference present in a reference signal utilizes a reference signal transmitted over a reference loop having a reference common loop length, said reference common loop length being the region of the reference loop that overlaps with the first of said loops, said reference signal being transmitted in the absence of the xDSL signal on the second of said loops; and the PSD of the xDSL signal is adjusted to generate at most the FEXT interference in the further xDSL signal in the presence of the xDSL signal on the second of said loops.

23. The method of claim 22, wherein the transmission power component is calculated as a function of the common loop length, a coupling constant for the first of said loops, an attenuation factor for each respective overlapping frequency and the reference FEXT interference.

* * * * *